Patented Jan. 9, 1951

2,537,816

UNITED STATES PATENT OFFICE 2,537,816

METHOD OF PREPARING UNSATURATED TRIAZINE ESTERS

James R. Dudley, Cos Cob, Conn., assignor to American Cyanamid Company, New York, N. Y., a corporation of Maine No Drawing. Application October 2, 1946, Serial No. 700,840

1 Claim. (Cl. 260—248)

This invention relates to a method of preparing unsaturated triazine esters. More particularly it relates to a method of preparing esters corresponding to the general formula (I) 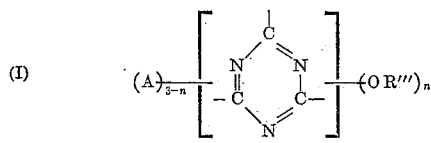

where A represents a monovalent radical selected from the class consisting of (a) monovalent saturated aliphatic, aromatic and nuclearly halogenated aromatic hydrocarbon radicals, (b) amino radicals represented by the formula —NRR′ where R and R′ each represents a member of the class consisting of hydrogen, monovalent saturated aliphatic hydrocarbon radicals and monovalent aromatic and nuclearly halogenated aromatic hydrocarbon radicals and (c) radicals represented by the formula —OR″ where R″ has the same meaning as R and R′, R‴ represents a monovalent radical which is the residue of a primary, ethylenically unsaturated monohydric alcohol containing at least 3 and not more than 10 carbon atoms, and $n$ represents an integer which is at least 1 and not more than 3. From a consideration of the above formula it will be seen that when $n$ is 3 there will be no radicals represented by A attached to the triazine nucleus.

Illustrative examples of monovalent radicals which R and R′ in the above formula may represent are: saturated aliphatic (e. g., methyl, ethyl, propyl, isopropyl, butyl, isobutyl, sec.-butyl, amyl, isoamyl, hexyl, octyl, decyl, dodecyl, octadecyl, etc.), including saturated cycloaliphatic (e. g., cyclopentyl, cyclohexyl, cycloheptyl, etc.) and aromatic-substituted aliphatic (e. g., benzyl, phenylethyl, phenylpropyl, phenylisopropyl, etc.); aromatic (e. g., phenyl, biphenylyl, naphthyl, etc.), including saturated aliphatic-substituted aromatic (e. g., tolyl, xylyl, ethylphenyl, propylphenyl, isopropylphenyl, butylphenyl, etc.); and nuclearly halogenated aromatic (e. g., chlorophenyl, bromophenyl, fluorophenyl, dichlorophenyl, trichlorophenyl, chlorobiphenylyl, chlorotolyl, iodotolyl, bromotolyl, chloroxylyl, ethyl chlorophenyl, propyl bromophenyl, etc.). Illustrative examples of monovalent radicals which R‴ in the above formula may represent are allyl, methallyl, ethallyl, propallyl, 2-butenyl, 3-butenyl, 3-methyl-2 - butenyl, 3-methyl-3-butenyl, 2-pentenyl, 3-pentenyl, 4-pentenyl, 2-methyl-2-pentenyl, 3-methyl-4-pentenyl, 2-hexenyl, 1,3-pentadienyl, 2,4-hexadienyl, 2-octenyl, 3-nonenyl, 2-decenyl, etc.

It is a primary object of the present invention to provide a method of preparing an unsaturated ester of the kind embraced by Formula I, specifically triallyl cyanurate, that is economical and relatively simple, and whereby the desired ester is obtained in high yields.

The foregoing object is attained by effecting reaction under alkaline conditions, which are maintained throughout the entire reaction period, and in the presence of an inorganic base, between (1) a compound corresponding to the general formula (II) 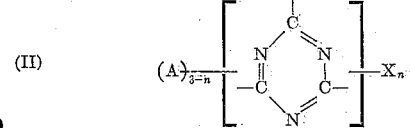

where A has the same meaning as given in Formula I and X represents a halogen selected from the class consisting of chlorine and bromine, and (2) a primary, ethylenically unsaturated monohydric alcohol containing at least 3 and not more than 10 carbon atoms, said alcohol being employed in an amount corresponding to at least one mol thereof for each atom represented by X in the formula for the compound of (1), and isolating the unsaturated ester from the resulting reaction mass. In the preparation of triallyl cyanurate the object is attained by, for example, dissolving sodium hydroxide in allyl alcohol in the absence of applied heat, agitating the resulting solution, adding slowly cyanuric chloride to the agitated solution, the sodium hydroxide being employed in the ratio of approximately 3 moles thereof per mole of cyanuric chloride and the allyl alcohol being employed in the ratio of substantially more than 3 moles thereof per mole of cyanuric chloride, agitating the reaction mass at room temperature until reaction between the reactants is substantially complete, filtering the reaction mass thereby to obtain a filter-cake comprising sodium chloride, washing said filter-cake with allyl alcohol, isolating crude triallyl cyanurate from the combined filtrate and washings, purifying the crude triallyl cyanurate by washing first with a dilute aqueous solution of sodium hydroxide and finally with water until all the alkali has been removed, and drying the resulting triallyl cyanurate.

The reaction may be carried out under a variety of temperature and pressure conditions, for instance at normal or at elevated temperatures, e. g., at the reflux temperature of the mixed reactants, and at atmospheric or superatmospheric pressure. However, atmospheric pressure and temperatures not substantially exceeding about 50° C., for instance temperatures of the order of 10° to 40° C. and more particularly ordinary room temperatures (20°–30° C.), are preferred. In general, the yields are somewhat higher when the reaction is effected in large part at temperatures of about 10° to 40° C. or 50° C. or thereabouts than when the reaction is carried out in its entirety at the reflux temperature of the mixed reactants. In order to insure complete reaction and thereby to obtain an optimum yield the reaction mass may be heated at an elevated temperature, e. g., temperatures of the order of 70° to 80° C. or even up to the reflux temperature of the reaction mass, toward the end of the reaction period.

If desired, the reaction may be effected in the presence of an inert solvent or mixture of solvents, that is, one which will not react with the reactants in the reaction mass. Illustrative examples of solvents that may be employed are ethers (e. g., diethyl ether, dibutyl ether, etc.), ketones (e. g., acetone, diethyl ketone, methyl ethyl ketone, etc.), liquid hydrocarbons (e. g., benzene, toluene, xylene, etc.), dialkyl ethers of ethylene glycol (e. g., dimethyl ether of ethylene glycol, etc.), dioxane, etc.

Various inorganic bases may be employed. I prefer to use an inorganic base that will react with the halogenotriazine reactant of the kind embraced by Formula II, specifically cyanuric chloride or bromide, to form a salt, more particularly a water-soluble salt, and which will provide alkaline conditions in the reaction mass during the entire reaction period. Illustrative examples of inorganic bases that may be employed are alkli-metal hydroxides (e. g., sodium hydroxide, potassium hydroxide, lithium hydroxide, etc.), alkali-metal carbonates (e. g., sodium carbonate, potassium carbonate, lithium carbonate, etc.), calcium hydroxide, barium hydroxide, trisodium phosphate, etc. Mixtures of inorganic bases may be employed if desired.

The use of sodium hydroxide or of sodium carbonate is generally to be preferred, although the former in some cases may impart more color to the reaction mixture and thence into the final product, particularly in the preparation of triallyl cyanurate. If, for example, sodium hydroxide is employed, it is preferably used in the form of a powder, and it is added to the alcohol prior to the addition of the halogenotriazine, e. g., cyanuric chloride or bromide. Such inorganic bases readily dissolve in the lower alcohols, e. g., allyl alcohol and methallyl alcohol, but a suspension of the base ordinarily results when it is added to the higher alcohols. However, a sufficient quantity of the base usually dissolves to maintain an alkaline condition in the reaction mass and to prevent direct reaction of the cyanuric chloride or bromide or other halogenotriazine reactant with the unsaturated alcohol to form hydroxytriazines. Although the base, e. g., sodium hydroxide, can be added as an aqueous solution, this practice is usually not desirable because increasing quantities of hydroxytriazines are obtained when increasing amounts of water are present. Consequently, the yield of the desired ester is reduced in a direct ratio with the amount of water.

Sodium carbonate is equally or more effective than sodium hydroxide in practicing my invention, but among its disadvantages are the evolution of carbon dioxide and the larger quantity required. Since sodium bicarbonate is ineffective as a hydrohalide acceptor in preparing the compounds with which this invention is concerned, one mole of sodium carbonate is required for each atom of chlorine or bromine in the halogenotriazine, and the precipitated salts consist of an equimolar mixture of sodium chloride and sodium bicarbonate. There is also some evidence that higher temperatures are required to complete the reaction if sodium carbonate is used than if sodium hydroxide is employed. However, higher yields of the ester may be generally obtained through the use of sodium carbonate and less discoloration of the product occurs.

The amount of inorganic base may be varied considerably, but in insure alkaline conditions during the entire reaction period it shou'd be employed in an amount corresponding to, when the halogenotriazine reactant is, for example, cyanuric chloride or bromide, at least 3 moles of the inorganic base per mole of cyanuric chloride or bromide.

The amount of unsaturated monohydric alcohol that is employed likewise may be varied considerably, but in all cases it is used in an amount corresponding to at least 1 mole of the alcohol for each atom of halogen (chlorine or bromine) in the halogenotriazine reactant.

In practicing my invention, alkaline conditions should prevail in the reaction mass during the entire reaction period. These conditions are obtained when an inorganic base is used that will provide alkaline conditions during the reaction period and when the base is employed in an amount such as indicated hereinbefore. Acid-forming hydrohalide acceptors, e. g., sodium bicarbonate and sodium acetate, are ineffective. When a preferred inorganic base, hydrohalide acceptor is employed, e. g., sodium hydroxide or sodium carbonate, the halogen salt that forms during the reaction usually precipitates from the reaction mass, especially when a large excess of alcohol is used. After the salt has been filtered from the reaction mass the excess alcohol is distilled off, leaving the desired unsaturated ester. This ester may be purified by suitable means, e. g., by recrystallization from hot water. If desired, the solution of the crude ester may be treated with a decolorizing carbon prior to recrystallization.

In order that those skilled in the art better may understand how the present invention may be carried into effect, the following examples are given by way of illustration and not by way of limitation. All parts are by weight.

EXAMPLE 1

*Preparation of 2-alloxy-4,6-diamino-1,3,5-triazine*

| | Parts | Approx. Molar Ratios |
|---|---|---|
| 2-chloro-4,6-diamino-1,3,5-triazine | 291 | 2.0 |
| Allyl alcohol | 855 | 14.7 |
| Sodium hydroxide | 80 | 2.0 |

The 2-chloro-4,6-diamino-1,3,5-triazine was prepared by dissolving 184.5 parts of cyanuric chloride in about 362 parts of dioxane and the resulting solution was then added to about 1265 parts of dilute aqueous ammonia (containing about 5 moles of ammonia) at a temperature below 40° C. Thereafter, the mixture was stirred for 30 minutes at room temperature and for 4 hours at about 47° to 53° C. The mixture was filtered and the solid product was washed until neutral to pH paper, after which it was dried in a forced draft oven at 70° C. The solid 2-chloro-4,6-diamino-1,3,5-triazine was ground and screened before use.

The above-stated amount of dry chlorodiaminotriazine was added to a solution of the sodium hydroxide dissolved in the allyl alcohol. The resulting mixture was heated on a steam bath for 1 hour. The reaction mass was filtered and 2-alloxy-4,6-diamino-1,3,5-triazine crystallized from the hot filtrate in a yield corresponding to 55.5% of the theoretical. Upon evaporation of the filtrate, an additional amount of alloxy derivative was obtained. The yield of alloxy compound resulting from the evaporation of the filtrate amounted to 21.3% of the theoretical, making a total yield of 76.8%. The melting point of the pure material was 181°–182° C. and gave the following analytical results:

Calculated for $C_6H_9ON_4$ _____ 43.11  5.38  41.92
Found _____ 42.91  5.44  41.99
                        43.04  5.59  42.03

EXAMPLE 2

*Preparation of 2-alloxy-4,6-diamino-1,3,5-triazine*

|  | Parts | Approx. Molar Ratios |
|---|---|---|
| 2-Chloro-4,6-diamino-1,3,5-triazine | 436 | 3.0 |
| Allyl alcohol | 1,710 | 29.4 |
| Sodium hydroxide | 120 | 3.0 |

In a 5-liter, round-bottomed, three-necked flask equipped with a stirrer and a reflux condenser there was placed about 1710 parts of allyl alcohol. The stirrer was started and, at room temperature (20°–30° C.), 120 parts of powdered sodium hydroxide was dissolved in the allyl alcohol. When all of the alkali had dissolved, the flask was placed on a steam bath, heated to 50° C. and the addition of 436 parts of dry, powdered 2-chloro-4,6-diamino-1,3,5-triazine was begun. The chlorotriazine was added quite rapidly. The temperature of the reaction mixture rose to gentle reflux during the addition, which required about 20 minutes. The mixture was then stirred and refluxed for 4 hours, cooled and filtered by suction on a Büchner funnel. The filter-cake was combined with the residue remaining after the removal of the allyl alcohol in the filtrate by distillation under reduced pressure, and extracted with 1000 parts of water to remove the sodium chloride. After drying, the weight of crude 2-alloxy-4,6-diamino-1,3,5-triazine was 443 parts. Recrystallization from 2670 parts of hot water with the aid of decolorizing carbon gave 355 parts (71 per cent of the theoretical) of 2-alloxy-4,6-diamino-1,3,5-triazine melting at 178°–179.5° C.

EXAMPLE 3

*Preparation of 2-amino-4,6-dialloxy-1,3,5-triazine*

|  | Parts | Approx. Molar Ratios |
|---|---|---|
| Cyanuric chloride | 553 | 3.0 |
| Dioxane | 1,035 |  |
| Ammonia (approx. 28% aqueous) | 362 | 6.0 |
| Water+ice | 4,500 |  |
| Allyl alcohol | 2,052 | 35.3 |
| NaOH, 96% | 252 | 6.0 |

2-amino-4,6-dichloro-1,3,5-triazine was first prepared by dissolving the above-stated amount of cyanuric chloride in the dioxane and filtering the resulting solution into the ice water. The ammonia was added to the aqueous suspension of cyanuric chloride at such a rate that the temperature remained below 5° C. during the addition. The mixture was stirred for 1 hour and was then filtered in a pressure filter at 18 pounds pressure for 2 hours to isolate 2-amino-4,6-dichloro-1,3,5-triazine.

The sodium hydroxide in the form of pellets was dissolved in the hot allyl alcohol. The 2-amino-4,6-dichloro-1,3,5-triazine was added to the solution of sodium hydroxide and allyl alcohol at a temperature of 20°–32° C. The reaction mixture was heated to 55° C. and allowed to cool to room temperature. After standing for about 16 hours the mixture was heated to 55° C., filtered and the filtrate evaporated under reduced pressure after the solution had been neutralized with dilute hydrochloric acid. When most of the allyl alcohol had been removed water was added. The solid was filtered and dried. An 89% yield of crude 2-amino-4,6-dialloxy-1,3,5-triazine melting at 50° C. was obtained.

The crude product was completely soluble in about 950 parts of ethanol. The alcoholic solution was treated with decolorizing carbon and poured into 4000 parts of water. The oil solidified after stirring for several hours. The purified material melted at 58°–61° C.

A portion of the product was dissolved in 50% aqueous dioxane at 68° C., and an oil was deposited upon cooling. This oil crystallized upon standing, and a 64% recovery of the 2-amino-4,6-dialloxy-1,3,5-triazine was realized.

A portion (105 parts) of the 2-amino-4,6-dialloxy-1,3,5-triazine which melted at 59°–61° C. was placed in a 500-ml. flask and distilled under vacuum. The pressure remained slightly under 1 mm. during the distillation. The bath temperature ranged from 165°–173° C. most of the time. When the temperature exceeded 175° C. heavy white fumes filled the system. Ninety-nine parts or 94.3% boiled at 151° C. at 1 mm. or less. Analysis of a sample of the distilled aminodialloxytriazine showed that it had not decomposed during the distillation.

Per cent N
Calculated for $C_9H_{12}O_2N_4$ _____ 26.92
Found _____ 27.01
                            27.18

EXAMPLE 4

*Preparation of 2-amino-4,6-dimethalloxy-1,3,5-triazine*

Amino dichloro triazine was prepared by the procedure described under Example 3. It was separated in a porcelain centrifuge. The weight of one mole of wet aminodichlorotriazine was 178 parts. This material was added to a solution of 80 parts (2 moles) of sodium hydroxide in 800 ml. of methallyl alcohol. The temperature was kept below 35° C. during the addition. After standing at room temperature for about 16 hours the reaction mixture was heated to 60° C. for 30 minutes, filtered hot and the filtrate evaporated under reduced pressure to a volume of about 250 ml. The solid material comprising 2-amino-4,6-dimethalloxy-1,3,5-triazine amounted to 125 parts after filtering and drying, and melted at 81°–89° C. An additional 64 parts of product was obtained by adding water to the filtrate. The total yield was 189 parts, or 80% of the theoretical.

A solution of 185 parts of the crude product in about 518 parts of dioxane was obtained by heating the mixture to 75° C. The solid which crystallized upon cooling was filtered. After heating this product at 50° C. in a forced draft oven and at the same temperature under reduced pressure, the dioxane had not been removed. The melting point was 82°–89° C. A small sample which had been crystallized from petroleum ether melted at 88°–89° C. and gave the following analysis:

|  | Per Cent C | Per Cent H | Per Cent N |
|---|---|---|---|
| Calculated for $C_{11}H_{16}O_2N_4$ | 55.93 | 6.78 | 23.73 |
| Found | 56.30 | 7.28 | 23.35 |
|  | 56.56 | 7.18 |  |

EXAMPLE 5

*Preparation of 2-phenylamino-4,6-dialloxy-1,3,5-triazine*

|  | Parts | Approx. Molar Ratios |
|---|---|---|
| Cyanuric chloride | 184.3 | 1.0 |
| Aniline | 93.1 | 1.0 |
| $Na_2CO_3$ | 53.0 | 0.5 |
| Ice water | 1,500.0 | |
| Dioxane | 320 | |
| Allyl alcohol | 684.0 | 11.8 |
| NaOH | 80.0 | 2.0 |

2-phenylamino-4,6-dichloro-1,3,5-triazine was prepared by dissolving the above-stated amount of cyanuric chloride in the hot dioxane and filtering the resulting solution into the mixture of cracked ice and water. The aniline was added slowly, followed by the addition of the sodium carbonate solution. The temperature was maintained below 8° C. The solid comprising 2-phenylamino-4,6-dichloro-1,3,5-triazine was separated in a porcelain centrifuge, washed with cold water, and added to the allyl alcohol solution of the sodium hydroxide. After the addition of the wet 2-phenylamino-4,6-dichloro-1,3,5-triazine the ice bath was removed and the mixture stirred. After standing for about 16 hours the reaction mixture was heated to 50°–60° C. for 30 minutes, filtered and evaporated under reduced pressure. The solid comprising 2-phenylamino-4,6-dialloxy-1,3,5-triazine was dissolved in about 200 parts of hot methanol, and 77 parts of product, melting at 128°–130° C., was obtained upon cooling. Several crystallizations from a hexane-benzene mixture gave a purer material having a melting point of 130.5°–131.5° C. The alcoholic filtrate was evaporated and added to the ice water. The oil which separated solidified after stirring for 1 hour, and 80 parts of additional material was obtained.

EXAMPLE 6

*Preparation of 2-octadecylamino-4,6-dialloxy-1,3,5-triazine*

|  | Parts | Approx. Molar Ratios |
|---|---|---|
| Cyanuric chloride | 92.2 | 0.5 |
| Acetone | 715.0 | |
| Octadecylamine | 135.0 | 0.5 |
| Sodium hydroxide | 20.0 | 0.5 |
| Allyl alcohol | 428.0 | 7.4 |
| Sodium hydroxide | 40.0 | 1.0 |

2-octadecylamino-4,6-dichloro-1,3,5-triazine was first prepared by dissolving the above-stated amount of cyanuric chloride in acetone and filtering the resulting solution into a 3-liter flask. The octadecylamine dissolved in acetone was slowly added to the acetone solution of the cyanuric chloride at 0° to 5° C. A 40% aqueous solution of 20 parts of sodium hydroxide was added to the mixed solutions at the same temperature. The mixture was stirred for 1 hour, yielding a solution containing 2-octadecylamino-4,6-dichloro-1,3,5-triazine.

A solution of 40 parts of sodium hydroxide dissolved in about 428 parts of allyl alcohol was added to the octadecylaminochlorotriazine solution at a temperature of 10° C. or less. After standing for about 16 hours the mixture was heated to 60° C. and filtered, yielding a filtrate containing 2-octadecylamino-4,6-dialloxy-1,3,5-triazine. A small amount of solid separated in the filtrate. The filtrate was cooled and refiltered. Twenty-four parts of a yellow solid thereby obtained melted at 82°–96° C. after crystallization from acetone. It gave a positive Beilstein test and was probably 2-chloro-4-octadecylamino-6-alloxytriazine.

The salt separated by the first filtration gave 4.5 parts of the same material when extracted with acetone. The main filtrate was evaporated under reduced pressure to remove acetone and excess allyl alcohol. The dark, viscous solution that remained and which comprised 2-octadecylamino-4,6-dialloxy-1,3,5-triazine hardened to a waxy material at 0° C. The yield was 162 parts, which corresponds to 70% of the theoretical.

EXAMPLE 7

*Preparation of 2-dodecylamino-4,6-dialloxy-1,3,5-triazine*

|  | Parts | Approx. Molar Ratios |
|---|---|---|
| Cyanuric chloride | 185.5 | 1.0 |
| Dodecylamine | 185.0 | 1.0 |
| Sodium carbonate | 53.0 | 0.5 |
| Allyl alcohol | 684.0 | 11.8 |
| Sodium hydroxide | 80.0 | 2.0 |
| Dioxane | 414.0 | |

Into a mixture of 800 parts of crushed ice and water contained in a 3-liter, round-bottomed flask equipped with a mechanical stirrer, there was filtered a solution prepared by dissolving the above-stated amount of cyanuric chloride in the stated amount of dioxane. The solution of cyanuric chloride was added to the vigorously stirred water-ice mixture at such a rate that a finely divided suspension of the cyanuric chloride in the water was obtained. The temperature was maintained at 0° C. by means of an ice bath. To this slurry of cyanuric chloride there was added simultaneously a solution of 185 parts of dodecylamine in about 200 parts of acetone, and 53 parts of sodium carbonate dissolved in 250 parts of water. The addition of the two solutions required about 1 hour at 0°–5° C. After the two solutions had been added, the reaction mixture was stirred at 5°–10° C. for 1 hour and then filtered by suction on a Büchner funnel to isolate 2-dodecylamino-4,6-dichloro-1,3,5-triazine.

The moist 2-dodecylamino-4,6-dichloro-1,3,5-triazine was charged into a 2-liter, round-bottomed, three-necked flask equipped with a stirrer, a reflux condenser, and a thermometer and containing a solution of 80 parts of sodium hydroxide dissolved in about 684 parts of allyl alcohol and cooled to 0° C. The stirrer was started immediately and, after 10 minutes, the flask was warmed to room temperature by placing it on a steam bath and then kept at room temperature for 30 minutes. The reaction mixture was thereafter heated to 60° C. for 15 minutes and filtered through a Büchner funnel to remove the precipitated sodium chloride. The filtrate was placed in a 2-liter distilling flask and the excess allyl alcohol removed by distillation under reduced pressure. The oil which remained solidified upon standing. The crude 2-dodecylamino-4,6-dialloxy-1,3,5-triazine amounted to 308 parts (82 per cent of the theoretical) and melted at 48°–52° C. Purification was effected by crystallization from methanol from which the pure material crystallized in white waxy needles melting at 49°–51° C. A sample which had been crystallized from methanol gave the following analysis:

|  | Per cent C | Per cent H | Per cent N |
|---|---|---|---|
| Calculated for $C_{21}H_{36}N_4O_2$ | 66.98 | 9.64 | 14.88 |
| Found | 66.90– 65.73 | 8.99– 9.99 | 15.46 15.63 |

EXAMPLE 8

*Preparation of 2-(N-methyl-N-phenylamino)-4,6-dichloro-1,3,5-triazine*

|  | Parts | Approx. Molar Ratios |
|---|---|---|
| Cyanuric chloride | 185.5 | 1.0 |
| Methylaniline | 107.0 | 1.0 |
| Sodium carbonate | 53.0 | 0.5 |

Into 800 parts of water at 0°–5° C. contained in a 2-liter, round-bottomed, three-necked flask fitted with a thermometer and a mechanical stirrer there was filtered a solution of 185.5 parts of cyanuric chloride in about 414 parts of dioxane. To the slurry of cyanuric chloride so prepared there was added over the course of about 40 minutes 107 parts of methylaniline. The temperature was kept below 10° C. during this addition. After all of the amine had been added the reaction mixture was stirred for 30 minutes. The stirrer was stopped, the 2-(N-methyl-N-phenylamino)-4,6-dichloro-1,3,5-triazine filtered off on a Büchner funnel and washed with 500 parts of cold water. After drying overnight in the oven at 100° C. there was obtained 255 parts of product (91 per cent of the theoretical), which melted at 131°–133° C.

*Preparation of 2-(N-methyl-N-phenylamino)-4,6-dialloxy-1,3,5-triazine*

|  | Parts | Approx. Molar Ratios |
|---|---|---|
| 2-(N-methyl-N-phenylamino)-4,6-dichloro-1,3,5-triazine | 255 | 1.0 |
| Allyl alcohol | 684 | 11.8 |
| Sodium hydroxide | 80 | 2.0 |

In a 2-liter, round-bottomed, three-necked flask fitted with a reflux condenser, a thermometer, and mechanical stirrer there was placed about 684 parts of allyl alcohol. The flask was immersed in a cold water bath, the stirrer started, and 80 parts of powdered sodium hydroxide was dissolved in the allyl alcohol at 20°–25° C. Next there was added in small portions 255 parts of 2-(N-methyl-N-phenylamino)-4,6-dichloro-1,3,5-triazine while keeping the temperature between 25° and 35° C. The addition of the dichlorotriazine required about 45 minutes. The mixture was then heated at reflux for 45 minutes and the precipitated sodium chloride filtered off on a Büchner funnel. The filter-cake was washed with about 85 parts of allyl alcohol. The filtrate and washings were combined and the excess allyl alcohol removed by distillation under reduced pressure. The thick, oily mass which remained was extracted with two portions (about 265 parts each) of benzene, and the benzene extracts dried with sodium sulfate. Evaporation of the benzene left a dark brown, oily material comprising 2-(N-methyl-N-phenylamino)-4,6-dialloxy-1,3,5-triazine.

EXAMPLE 9

*Preparation of 2-amino-4-butylamino-6-chloro-1,3,5-triazine*

|  | Parts | Approx. Molar Ratios |
|---|---|---|
| Cyanuric chloride | 185 | 1.0 |
| Ammonia (approx. 28% aqueous) | 122 | 2.0 |
| Butylamine | 73 | 1.0 |
| Sodium carbonate | 53 | 0.5 |
| Dioxane | 414 |  |

Into 800 parts of vigorously stirred ice and water at 0°–5° C. there was added a solution prepared by dissolving 185 parts of cyanuric chloride in about 400 parts of dioxane. To this slurry of cyanuric chloride there was added about 122 parts of approximately 28 per cent aqueous ammonia. The temperature was maintained below 10° C. Stirring was continued for 1 hour after all of the ammonia had been added. The aminodichlorotriazine was filtered off, washed with 500 parts of ice water, and charged into a 2-liter, round-bottomed, three-necked flask fitted with a thermometer, a 125-ml. dropping funnel, and a mechanical stirrer. About 320 parts of acetone was added to the flask, the stirrer was started, and at 30°–40° C. there was added dropwise a solution of 73 parts of butylamine in about 120 parts of acetone. Stirring was continued for 1 hour; then a solution of 53 parts of sodium carbonate dissolved in 150 parts of water was added. The mixture was again stirred for an additional half hour, 1000 parts of cold water added, and the crude 2-amino-4-butylamino-6-chloro-1,3,5-triazine filtered off. After drying overnight, 171 parts of product was obtained, which corresponded to 85 per cent of the theoretical. A sample recrystallized from aqueous methanol melted at 148°–150° C. and gave the following analysis:

|  | Per cent N |
|---|---|
| Calculated for $C_7H_{12}N_5Cl$ | 34.72 |
| Found | 35.18 |
|  | 35.26 |

*Preparation of 2-amino-4-butylamino-6-alloxy-1,3,5-triazine*

|  | Parts | Approx. Molar Ratios |
|---|---|---|
| 2-Amino-4-butylamino-6-chloro-1,3,5-triazine | 201.5 | 1.0 |
| Sodium hydroxide | 40.0 | 1.0 |
| Allyl alcohol | 684.0 | 11.8 |

In a 2-liter, round-bottomed, three-necked flask fitted with a reflux condenser, a mechanical stirrer, and a thermometer was placed 684 parts of allyl alcohol containing 40 parts of dissolved sodium hydroxide. The motor was started and, to the vigorously stirred solution, there was added 201.5 parts of 2-amino-4-butylamino-6-chloro-1,3,5-triazine prepared as above described. The flask was then placed on a steam bath, and the temperature of the reaction mixture gradually raised to 70°–90° C. for 2 hours. The precipitated sodium chloride was filtered off on a Büchner funnel, and the excess allyl alcohol was removed from the filtrate by evaporation under reduced pressure. The solid remaining amounted to 178 parts (78 per cent of the theoretical). Purification of the crude 2-amino-4-butylamino-6-alloxy-1,3,5-triazine was effected by crystallization from aqueous dioxane. A sample recrystallized from a dioxane-water mixture gave a recovery of 70 per cent, melted at 104.5°–106° C., and gave the following analysis:

|  | Per cent N |
|---|---|
| Calculated for $C_{10}H_{17}N_3O$ | 31.36 |
| Found | 31.00 |
|  | 30.74 |

EXAMPLE 10

*Preparation of 2-amino-4-chloro-6-alloxy-1,3,5-triazine*

METHOD A

|  | Parts | Approx. Molar Ratios |
|---|---|---|
| Cyanuric chloride | 370 | 2.0 |
| Ammonia (approx. 28% aqueous) | 244 | 4.0 |
| Allyl alcohol | 1,368 | 23.6 |
| Dioxane | 828 |  |
| Water | 1,600 |  |
| Sodium carbonate | 424 | 4.0 |

2-amino-4,6-dichloro-1,3,5-triazine was prepared by first placing 1600 parts of cold water in a 2-liter, three-necked, round-bottomed flask fitted with a mechanical stirrer, a thermometer and a dropping funnel. The flask was immersed in an ice-salt mixture, the stirrer started and, when the internal temperature had dropped to 5° C., there was added a warm solution of 370 parts cyanuric chloride dissolved in about 828 parts of dioxane. The solution of the cyanuric chloride in the dioxane was added at such a rate that a finely dispersed suspension of the cyanuric chloride in the water was obtained. To this slurry of cyanuric chloride there was added dropwise at 0°–5° about 224 parts of approximately 28 per cent aqueous ammonia. The addition of the ammonia required about 1 hour. The mixture was then stirred an additional half hour, and was filtered as dry as possible by suction on a Büchner funnel. The crude 2-amino-4,6-dichloro-1,3,5-triazine on the filter was washed with 1000 parts of cold water to remove any ammonium chloride.

Two moles of moist 2-amino-4,6-dichloro-1,3,5-triazine prepared as above described was charged into a 5-liter, round-bottomed, three-necked flask equipped with a reflux condenser, a thermometer, and an efficient stirrer. The stirrer was started, and about 1368 parts of allyl alcohol followed by 424 parts of anhydrous sodium carbonate were added to the flask. The reaction mixture was then heated at reflux for 3 hours.

After standing for about 16 hours, the mixture was again heated to reflux and filtered. The filter-cake was washed with about 171 parts of allyl alcohol. The solid comprising crude 2-amino-4-chloro-6-alloxy-1,3,5-triazine which separated on cooling the combined filtrate and washings was filtered off. The remainder of the product was obtained by distillation of the excess allyl alcohol from the filtrate under reduced pressure. The two portions after drying amounted to 336 parts (80 per cent of the theoretical). A portion of the material purified by recrystallization from methanol melted at 175°–176° C. and gave the following analysis:

|  | Per cent N |
|---|---|
| Calculated for $C_6H_7N_4OCl$ | 30.02 |
| Found | 29.80 |
|  | 29.54 |

METHOD B

|  | Parts | Approx. Molar Ratios |
|---|---|---|
| Cyanuric chloride | 555 | 3.0 |
| Sodium carbonate | 954 | 9.0 |
| Ammonia (approx. 28% aqueous) | 183 | 3.0 |
| Allyl alcohol | 2,052 | 35.3 |

In a 5-liter, round-bottomed, three-necked flask fitted with a reflux condenser, a dropping funnel and a mechanical stirrer were placed about 2052 parts allyl alcohol, 555 parts of cyanuric chloride, and 954 parts of anhydrous sodium carbonate. The flask was immersed in an ice bath, and the motor started. When the temperature had dropped to 10° C. there was added dropwise about 183 parts of approximately 28 per cent aqueous ammonia. The time required for the addition of the ammonia was about 1½ hours. The reaction mixture was stirred for an additional hour at 10° C. and then gradually warmed to and kept at reflux for 2 hours.

After standing for about 16 hours, the mixture was warmed to 80° C. and filtered. The residue in the filter was washed with about 635 parts of hot methanol. The combined filtrate and washings were evaporated to about 800 parts under reduced pressure, diluted with 1000 parts of cold water and filtered. The crude 2-amino-4-chloro-6-alloxy-1,3,5-triazine was dissolved in about 2800 parts of boiling methanol. Upon cooling, the solution yielded 371 parts of 2-amino-4-chloro-6-alloxy-1,3,5-triazine melting at 172°–175° C. This represents a yield of 66 per cent of the theoretical.

*Preparation of 2-amino-4,6-dialloxy-1,3,5-triazine from 2-amino-4-chloro-6-alloxy-1,3,5-triazine*

|  | Parts | Approx. Molar Ratios |
|---|---|---|
| 2-Amino-4-chloro-6-alloxy-1,3,5-triazine | 47 | 0.25 |
| Trisodium phosphate dodecahydrate | 98 | 0.25 |
| Allyl alcohol | 171 | 2.94 |
| Water | 50 |  |

In a 1-liter, round-bottomed, three-necked flask fitted with a mechanical stirrer and a reflux condenser were placed about 171 parts of substantially pure allyl alcohol, 50 parts of water, and 47 parts of 2-amino-4-chloro-6-alloxy-1,3,5-triazine. The motor was started, and the flask was heated on a steam bath. When the allyl alcohol had begun to reflux, 98 parts of trisodium phosphate dodecahydrate was slowly added. All of the trisodium phosphate dissolved. The mixture was stirred and refluxed for 3 hours. The excess allyl alcohol was removed by distillation under reduced pressure after adding 500 parts of water to the reaction mixture. The oily residue remaining was thoroughly agitated with about 150 parts of aqueous one per cent sodium hydroxide solution at 80°–90° C. After filtering through glass wool, the mixture was placed in a 500-ml., round-bottomed flask fitted with a stirrer, and stirred vigorously. Upon cooling, the mixture yielded 42 parts (81 per cent of the theoretical) of white, granular 2-amino-4,6-dialloxy-1,3,5-triazine, M. P. 56°–59° C.

EXAMPLE 11

*Preparation of triallyl cyanurate*

|  | Parts | Approx. Molar Ratios |
|---|---|---|
| Cyanuric chloride | 185.5 | 1.0 |
| Allyl alcohol (90%) | 870.0 | 13.2 |
| Sodium carbonate, anhydrous | 318.0 | 3.0 |

To a stirred suspension of 318 parts of anhydrous sodium carbonate in 870 parts of 90% allyl alcohol contained in a three-necked, round-bottomed flask, there was added 185.5 parts of cyanuric chloride. The cyanuric chloride was added in small portions and at such a rate that the temperature did not rise above 40° C. Vigorous stirring was maintained at all times.

When the addition of the cyanuric chloride had been completed, the mixture was heated gradually on the steam bath over a period of 3 hours to 75° to 80° C., and filtered. The filter-cake was washed with about 85 parts of allyl alcohol. The filtrate and washings were combined and the excess allyl alcohol was removed by distillation under reduced pressure. The yield of the crude triallyl cyanurate amounted to 212 parts (85% of the theoretical). A small sample which had been recrystallized from aqueous methanol melted at 29°–30° C., boiled at 137° to 140° C. at 0.4 to 0.5 mm. pressure, and gave the following analytical results:

Per cent N
Calculated for $C_{12}H_{15}N_3O_3$ —— 16.87
Found —— 16.84
 16.66

EXAMPLE 12

*Preparation of triallyl cyanurate*

|  | Parts | Approx. Molar Ratios |
|---|---|---|
| Cyanuric chloride | 185.5 | 1.0 |
| Allyl alcohol (90%) | 870.0 | 13.2 |
| Sodium hydroxide | 120.0 | 3.0 |

In a 2-liter, three-necked, round-bottomed flask fitted with a mechanical stirrer and a thermometer was placed 870 parts of 90% allyl alcohol containing 120 parts of dissolved sodium hydroxide. The use of powdered sodium hydroxide facilitates the preparation of this solution. The alkali was dissolved in the allyl alcohol at room temperature (20° to 30° C.) or slightly below, as any heating of the alkali-alcohol mixture promotes excessive discoloration of the allyl alcohol, much of which is carried over into the final product. The stirrer was then started and the addition of 185.5 parts of solid cyanuric chloride begun. The reaction was rapid and vigorous, and the addition of the total amount of cyanuric chloride required about 1 hour. The mixture was stirred for 2 hours at room temperature and filtered with suction on a Büchner funnel. The filter-cake comprising sodium chloride was washed with about 130 parts of allyl alcohol. The combined filtrate and washings were concentrated on a steam bath under reduced pressure until nearly all the allyl alcohol had been removed. One thousand parts of water was then added and the distillation was continued until about another 300 to 400 parts of distillate had been collected. The volume of the mixture in the distilling flask at this point was about 600 to 700 parts. As much as possible of the supernatant aqueous layer was then decanted from the crude triallyl cyanurate and was replaced by about 200 parts of 5% aqueous NaOH solution. The mixture was stirred vigorously, and the layers allowed to separate. The upper aqueous layer was decanted as before and the process repeated with fresh 5% aqueous NaOH solution and finally with warm water until all the alkali had been removed. The triallyl cyanurate was dried by heating under reduced pressure on a steam bath. There was obtained about 187 parts of triallyl cyanurate, which is about 76% of the theoretical.

EXAMPLE 13

Essentially the same procedure was followed as described under Example 12 with the exception that about 684 parts of 100% allyl alcohol was employed, and the cyanuric chloride was dissolved in about 414 parts of dioxane and added to the allyl alcohol-sodium hydroxide mixture. Triallyl cyanurate in an amount corresponding to about 71% of the theoretical was obtained.

EXAMPLE 14

Same as Example 13 with the exception that about 317 parts of acetone was used in place of 414 parts of dioxane. A yield of triallyl cyanurate corresponding to about 68% of the theoretical was obtained.

EXAMPLE 15

Same as Example 12 with the exception that about 318 parts cyanuric bromide is used in place of 185.5 parts cyanuric chloride.

EXAMPLE 16

Same as Example 12 with the exception that about 1060 parts of 90% methallyl alcohol is used in place of 870 parts of 90% allyl alcohol. A good yield of trimethallyl cyanurate is obtained.

EXAMPLE 17

*Preparation of 2-(2',5'-dichlorophenylamino)-4,6-dialloxy-1,3,5-triazine*

METHOD A

|  | Parts | Approx. Molar Ratios |
|---|---|---|
| Cyanuric chloride | 92.1 | 0.5 |
| 2,5-Dichloroaniline | 81.0 | 0.5 |
| Allyl alcohol | 428.0 | 7.4 |
| Sodium hydroxide (approx. 97% NaOH) | 61.8 | 1.5 |

To a slurry consisting of 92.1 parts of cyanuric chloride and about 428 parts of allyl alcohol contained in a one-liter, three-necked flask equipped with a mechanical stirrer and surrounded by an ice bath, there was added 81 parts of 2,5-dichloroaniline in small portions over a 40-minute period. After maintaining the temperature below 3° C. for an additional half hour, 20.6 parts of powdered sodium hydroxide was added over a half-hour period. After another half hour, a second portion consisting of 41.2 parts of sodium hydroxide was added over the same period. The cooling bath was removed 45 minutes later, and the temperature gradually rose to 47° C. over a 75-minute period. The flask was heated on a steam bath for 1½ hours. The hot slurry was filtered to remove the insoluble material, and a product comprising 2 - (2',5' - dichlorophenylamino)-4,6-dialloxy-1,3,5-triazine crystallized on cooling the hot filtrate.

The slurry containing the 2-(2',5'-dichlorophenylamino) - 4,6 - dialloxy-1,3,5-triazine was filtered, and the recovered solid was washed with several portions of water to remove the adherent allyl alcohol. The yield of 2-(2',5'-dichlorophenylamino)-4,6-dialloxy-1,3,5-triazine, melting at 90°–91° C., was 118 parts or 67.1% of the theoretical.

METHOD B

|  | Parts | Approx. Molar Ratios |
| --- | --- | --- |
| Cyanuric chloride | 460 | 2.5 |
| Water | 2,000 |  |
| Acetone | 792 |  |
| 2,5-Dichloroaniline | 405 | 2.5 |
| Sodium hydroxide | 103 | 2.5 |
| Allyl alcohol | 2,138 | 36.8 |
| Sodium hydroxide (approx. 97% NaOH) | 206 | 5.0 |

Cyanuric chloride, 460 parts, was added to a mixture consisting of 2000 parts of water and about 792 parts of acetone while cooling below 3° C. To the resulting slurry, 405 parts of dichloroaniline was added over a one-half hour period. After agitating for an additional hour, a solution consisting of 103 parts of sodium hydroxide dissolved in 500 parts of water was added through a dropping funnel over a 45-minute period. The slurry was agitated for 15 minutes longer and then filtered. The solid, after pressing dry with a rubber dam, weighed 1364.5 parts and was calculated to contain approximately 590 parts of water. After dissolving 206 parts of powdered sodium hydroxide in about 2138 parts of allyl alcohol while maintaining the temperature below 10° C., the solid obtained above and which comprised 2-(2',5'-dichlorophenylamino) - 4,6-dichloro-1,3,5-triazine was added thereto in small portions over a one-half hour period. The cooling bath was removed after 15 minutes, whereupon the temperature rose slowly to 43° C. At this point, the reaction slurry was chilled by means of tap water, and the temperature immediately dropped to 35° C. Crystallization suddenly took place to give a thick slurry which was allowed to stand overnight. On the following day, the slurry was heated to reflux and then filtered through a Büchner funnel. The product comprising 2-(2',5'-dichlorophenylamino)-4,6-dialloxy-1,3,5-triazine deposited from the filtrate on cooling, and was recovered by filtration. This crop weighed 679 parts and melted at 89.5°–91° C. A second crop weighing 61.5 parts was recovered by re-slurrying the insoluble material from the first filtration in the filtrate from the second. After heating and filtering, the second crop was isolated from the filtrate. The combined yield of 2-(2',5'-dichlorophenylamino)-4,6-dialloxy-1,3,5-triazine was 740.5 parts or 84% of the theoretical.

A 93% recovery was realized on recrystallizing 977 parts of crude material from about 2960 parts of 2-B alcohol. The product was treated with decolorizing carbon during this recrystallization. The purified material melted at 89.5°–90° C. and gave a clear, water-white melt. A sample gave the following analytical data:

|  | Per cent C | Per cent H | Per cent Cl |
| --- | --- | --- | --- |
| Calculated for $C_{15}H_{14}O_2N_4Cl_2$ | 50.99 | 3.97 | 20.11 |
| Found | 50.86 | 4.06 | 20.08 |
|  | 50.85 | 4.01 | 20.02 |

EXAMPLE 18

*Preparation of 2-pentachlorophenoxy-4,6-dialloxy-1,3,5-triazine*

|  | Parts | Approx. Molar Ratios |
| --- | --- | --- |
| Pentachlorophenol | 420.0 | 1.57 |
| Sodium hydroxide | 62.8 | 1.57 |
| Water | 1550.0 |  |
| Cyanuric chloride | 289.0 | 1.57 |
| Acetone | 584.0 |  |
| Allyl alcohol | 1283.0 | 21.3 |
| Sodium hydroxide, (approx. 97% NaOH) | 129.5 | 3.14 |

A solution of pentachlorophenol was prepared by dissolving 420 parts of twice recrystallized crude pentachlorophenol in a solution consisting of 62.8 parts of sodium hydroxide and 1250 parts of water. The mixture was heated to 90° C. in order to effect solution. A slurry of cyanuric chloride was next prepared from 289 parts of cyanuric chloride, 584 parts of acetone and 300 parts of water. The cyanuric chloride was added to the aqueous acetone contained in a 5-liter, three-necked flask equipped with a mechanical stirrer and surrounded by an ice bath. To the resulting slurry, the pentachlorophenol solution was added through a dropping funnel over a 1½ hour period while maintaining the temperature below 5° C. The slurry was agitated for ½ hour after completing this addition, and then filtered. The wet product comprising 2-pentachlorophenoxy - 4,6 - dichloro-1,3,5-triazine amounted to 1028.5 parts and was calculated to contain 378.5 parts of water. This solid was then added over a 1-hour period to a solution of 129.5 parts of sodium hydroxide in about 1283 parts of allyl alcohol while maintaining the temperature below 10° C. by means of an ice bath. After 20 minutes, the cooling bath was removed. Since only a slight rise in the temperature occurred over a ½-hour period, the reaction mixture was heated over a steam bath and maintained between 50°–60° C. for 20 minutes. The slurry was heated to reflux, and after adding an additional 428 parts of allyl alcohol, it was filtered through a preheated Büchner funnel. The product comprising 2-pentachlorophenoxy-4,6-dialloxy - 1,3,5 - triazine crystallized from the filtrate on cooling, and was recovered by filtration in a yield amounting to 477.5 parts. The filtrate was used to re-slurry the insoluble material obtained from the first filtration. On heating this slurry and filtering, an additional 36 parts of product was recovered. The combined yield of 2-pentachlorophenoxy-4,6-dialloxy-1,3,5-triazine, melting at 91°–95° C., was 513.5 parts or 72% of the theoretical. A smaller run prepared in a similar manner gave rise to a 78.5% yield of product.

A 91% recovery of material was obtained on recrystallizing 535 parts of crude material from about 1027 parts of 2-B alcohol. The product was treated with decolorizing carbon during this recrystallization. The purified material, melting at 94°–95° C., gave the following analytical data:

|  | Per cent C | Per cent H | Per cent Cl |
|---|---|---|---|
| Calculated for $C_{15}H_{10}O_3N_3Cl_5$ | 39.34 | 2.19 | 38.79 |
| Found | 39.44 | 2.65 | 38.94 |
|  | 39.44 | 2.36 |  |

It will be understood, of course, by those skilled in the art that my invention is not limited to the specific reactants named in the above illustrative examples. Thus, instead of allyl alcohol or methallyl alcohol, any other primary, ethylenically unsaturated monohydric alcohol containing at least 3 and not more than 10 carbon atoms may be employed, e. g., ethallyl alcohol, propallyl alcohol, crotyl alcohol, 3-buten-1-ol, 3-methyl-2-buten-1-ol, 3-ethyl-2-buten-1-ol, 2-methyl-3-buten-1-ol, 2-penten-1-ol, 2-methyl-2-penten-1-ol, 2,4-dimethyl-2-penten-1-ol, 3-penten-1-ol, 2-ethyl-3-penten-1-ol, 4-penten-1-ol, 3-methyl-4-penten-1-ol, 2-hexen-1-ol, 2-octen-1-ol, 2,4-pentadien-1-ol, 2,4-hexadien-1-ol, 3-nonen-1-ol, 2-decen-1-ol, etc.

Illustrative examples of halogenotriazines that may be used in practicing the present invention, depending upon the particular ester desired, are:

2-amino-4,6-dibromo-1,3,5-triazine
2-bromo-4,6-diamino-1,3,5-triazine
2-methylamino-4,6-dichloro-1,3,5-triazine
2-bromo-4,6-di-(phenylamino)-1,3,5-triazine
2-methyl-4,6-dichloro-1,3,5-triazine
2-methoxy-4,6-dibromo-1,3,5-triazine
2-chloro-4,6-diethoxy-1,3,5-triazine
2-chloro-4,6-di-(N,N-dimethylamino)-1,3,5-triazine
2-phenyl-4,6-dibromo-1,3,5-triazine
2-chloro-4,6-ditolyl-1,3,5-triazine
2-phenoxy-4,6-dichloro-1,3,5-triazine
2-chloro-4,6-di-(dichlorophenoxy)-1,3,5-triazine
2-chlorophenylamino-4,6-dichloro-1,3,5-triazine
2-benzyl-4,6-dibromo-1,3,5-triazine
2-bromophenoxy-4,6-dibromo-1,3,5-triazine
2-phenylamino-4,6-dichloro-1,3,5-triazine
2-chloro-4,6-di-(chlorophenylamino)-1,3,5-triazine
2-tolyl-4,6-dichloro-1,3,5-triazine
2-propoxy-4,6-dibromo-1,3,5-triazine
2-[N,N-di-(chlorophenylamino)]-4,6-dichloro-1,3,5-triazine
2-hydroxy-4,6-dichloro-1,3,5-triazine
2-bromo-4,6-dihydroxy-1,3,5-triazine
2-benzylamino-4,6-dichloro-1,3,5-triazine
2-bromo-4,6-di-(phenylethylamino)-1,3,5-triazine
2-chloro-4,6-ditolylamino-1,3,5-triazine Illustrative examples of unsaturated esters embraced by Formula I that may be produced in accordance with the present invention are:

2-methalloxy-4,6-diamino-1,3,5-triazine
2-methyl-4-amino-6-alloxy-1,3,5-triazine
2-hydroxy-4,6-dialloxy-1,3,5-triazine
2-hydroxy-4-ethyl-6-methalloxy-1,3,5-triazine
2-methoxy-4,6-dialloxy-1,3,5-triazine
2-butylamino-4-methoxy-6-(2'-butenyloxy)-1,3,5-triazine
2-methylamino-4,6-dimethalloxy-1,3,5-triazine
2-(2'-decenyloxy)-4,6-di-(methylamino)-1,3,5-triazine
2-alloxy-4,6-dianilino-1,3,5-triazine
2-tolyl-4,6-dimethalloxy-1,3,5-triazine
2-ethalloxy-4,6-diethoxy-1,3,5-triazine
2-alloxy-4,6-dibutyl-1,3,5-triazine
2-propalloxy-4,6-dihydroxy-1,3,5-triazine
2-alloxy-4,6-dimethalloxy-1,3,5-triazine
2-chloroanilino-4,6-dialloxy-1,3,5-triazine
2-phenyl-4,6-dialloxy-1,3,5-triazine
2-methyl-4,6-dimethalloxy-1,3,5-triazine
Triethallyl cyanurate
Tri-(2-butenyl) cyanurate
Tri-(3-methyl-2-butenyl) cyanurate
Tri-(2-hexenyl) cyanurate
Tri-(2-decenyl) cyanurate Other examples will be apparent to those skilled in the art from the first and second paragraphs of this specification and from the examples of unsaturated alcohols and halogenotriazines given in the paragraphs immediately preceding.

In a manner similar to that described above with particular reference to the preparation of unsaturated esters of 1,3,5-triazines, corresponding derivatives of the 3,5,6-substituted 1,2,4-triazines and of the 4,5,6-substituted 1,2,3-triazines may be prepared.

What I claim as new and desire to secure by Letters Patent of the United States is:

The method of preparing triallyl cyanurate which comprises dissolving sodium hydroxide in allyl alcohol in the absence of applied heat, agitating the resulting solution, slowly adding cyanuric chloride to the agitated solution, the sodium hydroxide being employed in the ratio of approximately 3 moles thereof per mole of cyanuric chloride and the allyl alcohol being employed in the ratio of substantially more than 3 moles thereof per mole of cyanuric chloride, agitating the reaction mass at room temperature until reaction between the reactants is substantially complete, filtering the reaction mass thereby to obtain a filter-cake comprising sodium chloride, washing said filter-cake with allyl alcohol, isolating crude triallyl cyanurate from the combined filtrate and washings, purifying the crude triallyl cyanurate by washing first with a dilute aqueous solution of sodium hydroxide and finally with water until all the alkali has been removed, and drying the resulting triallyl cyanurate.

JAMES R. DUDLEY.

REFERENCES CITED

The following references are of record in the file of this patent:

UNITED STATES PATENTS

| Number | Name | Date |
|---|---|---|
| 2,258,130 | Bruson | Oct. 7, 1941 |
| 2,296,823 | Pollach | Sept. 22, 1942 |
| 2,306,440 | Heintrich | Dec. 29, 1942 |

OTHER REFERENCES

Berichte, vol. 20 (1887), page 2238.
Controulis: J. American Chem. Soc., Nov. 1945, pp. 1946–1948.

Certificate of Correction

Patent No. 2,537,816 January 9, 1951

JAMES R. DUDLEY

It is hereby certified that error appears in the printed specification of the above numbered patent requiring correction as follows:

Column 1, line 2, strike out "triazine"; column 3, line 40, for "alkli-metal" read *alkali-metal*; column 4, line 17, for the word "in" read *to*; line 63, Example 1, in the table, first column thereof, for "ciamino" read *diamino*; column 7, line 30, Example 5, in the table, second column thereof, for "3 2.0" read *362.0*; column 11, line 53, for "0°–5° about 224 parts" read *0°–5° C. about 244 parts*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*